US009916366B1

(12) United States Patent
Shukla et al.

(10) Patent No.: US 9,916,366 B1
(45) Date of Patent: Mar. 13, 2018

(54) QUERY AUGMENTATION

(71) Applicant: Google Inc., Mountain View, CA (US)

(72) Inventors: Anand Shukla, Santa Clara, CA (US);
Mark Pearson, San Mateo, CA (US);
Krishna Bharat, Palo Alto, CA (US);
Stefan Buettcher, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/811,218

(22) Filed: Jul. 28, 2015

Related U.S. Application Data

(63) Continuation of application No. 12/404,424, filed on Mar. 16, 2009, now Pat. No. 9,128,945.

(60) Provisional application No. 61/053,852, filed on May 16, 2008, provisional application No. 61/090,044, filed on Aug. 19, 2008.

(51) Int. Cl.
*G06F 7/00* (2006.01)
*G06F 17/30* (2006.01)
*G06F 17/00* (2006.01)

(52) U.S. Cl.
CPC ...... *G06F 17/3053* (2013.01); *G06F 17/3064* (2013.01); *G06F 17/30528* (2013.01); *G06F 17/30554* (2013.01); *G06F 17/30637* (2013.01); *G06F 17/30864* (2013.01)

(58) Field of Classification Search
CPC ........... G06F 17/30637; G06F 17/3064; G06F 17/3053; G06F 17/30554; G06F 17/30528
USPC .................................................. 707/713, 721
See application file for complete search history.

(56) References Cited

U.S. PATENT DOCUMENTS

| | | | |
|---|---|---|---|
| 5,920,854 A | 7/1999 | Kirsch |
| 5,963,932 A | 10/1999 | Jakobsson |
| 6,006,222 A | 12/1999 | Culliss |
| 6,006,225 A | 12/1999 | Bowman |
| 6,014,665 A | 1/2000 | Culliss |
| 6,078,916 A | 6/2000 | Culliss |
| 6,169,986 B1 | 1/2001 | Bowman |
| 6,182,068 B1 | 1/2001 | Culliss |
| 6,185,559 B1 | 2/2001 | Brin |
| 6,275,820 B1 | 8/2001 | Navin |
| 6,285,999 B1 | 9/2001 | Page |
| 6,321,228 B1 | 11/2001 | Crandall |
| 6,353,849 B1 | 3/2002 | Linsk |

(Continued)

FOREIGN PATENT DOCUMENTS

| | | |
|---|---|---|
| WO | WO2000077689 A1 | 12/2000 |
| WO | WO2001067297 A1 | 9/2001 |

OTHER PUBLICATIONS

Boyan, J. et al., "A Machine Learning Architecture for Optimizing Web Search Engines," School of Computer Science, Carnegie Mellon University, May 10, 1996, pp. 1-8.

(Continued)

*Primary Examiner* — Kannan Shanmugasundaram
(74) *Attorney, Agent, or Firm* — Fish & Richardson P.C.

(57) ABSTRACT

Methods, systems, and apparatus, including computer program products, for generating or using augmentation queries. In one aspect, a first query stored in a query log is identified and a quality signal related to the performance of the first query is compared to a performance threshold. The first query is stored in an augmentation query data store if the quality signal indicates that the first query exceeds a performance threshold.

20 Claims, 9 Drawing Sheets

(56) References Cited

U.S. PATENT DOCUMENTS

| | | |
|---|---|---|
| 6,366,934 B1 | 4/2002 | Cheng |
| 6,424,980 B1 | 7/2002 | Iizuka |
| 6,526,440 B1 | 2/2003 | Bharat |
| 6,529,903 B2 | 3/2003 | Smith |
| 6,539,377 B1 | 3/2003 | Culliss |
| 6,564,213 B1* | 5/2003 | Ortega ............ G06F 17/3064 |
| 6,567,103 B1 | 5/2003 | Chaudhry |
| 6,601,061 B1 | 7/2003 | Holt |
| 6,615,209 B1 | 9/2003 | Gomes |
| 6,658,423 B1 | 12/2003 | Pugh |
| 6,678,681 B1 | 1/2004 | Brin |
| 6,684,204 B1 | 1/2004 | Lal |
| 6,721,736 B1 | 4/2004 | Krug |
| 6,725,259 B1 | 4/2004 | Bharat |
| 6,728,704 B2 | 4/2004 | Mao |
| 6,732,086 B2 | 5/2004 | Plow |
| 6,732,087 B1 | 5/2004 | Hughes |
| 6,738,764 B2 | 5/2004 | Mao |
| 6,745,178 B1 | 6/2004 | Emens |
| 6,754,873 B1 | 6/2004 | Law |
| 6,826,559 B1 | 11/2004 | Ponte |
| 6,832,218 B1 | 12/2004 | Emens |
| 6,847,972 B1 | 1/2005 | Vernau |
| 6,853,993 B2 | 2/2005 | Ortega |
| 6,873,982 B1 | 3/2005 | Bates |
| 6,877,002 B2 | 4/2005 | Prince |
| 6,990,453 B2 | 1/2006 | Wang |
| 7,051,014 B2 | 5/2006 | Brill |
| 7,058,624 B2 | 6/2006 | Masters |
| 7,152,061 B2 | 12/2006 | Curtis |
| 7,165,080 B2 | 1/2007 | Kotcheff |
| 7,206,780 B2 | 4/2007 | Slackman |
| 7,277,928 B2 | 10/2007 | Lennon |
| 7,296,016 B1 | 11/2007 | Farach |
| 7,574,426 B1 | 8/2009 | Ortega |
| 7,689,615 B2 | 3/2010 | Burges |
| 7,756,857 B2 | 7/2010 | Wan |
| 8,145,623 B1 | 3/2012 | Mehta |
| 9,208,232 B1 | 12/2015 | Tirumalareddy et al. |
| 2002/0042791 A1 | 4/2002 | Smith |
| 2002/0049752 A1 | 4/2002 | Bowman |
| 2002/0069190 A1 | 6/2002 | Geiselhart |
| 2002/0078020 A1 | 6/2002 | Lawton |
| 2002/0123988 A1 | 9/2002 | Dean |
| 2002/0129014 A1 | 9/2002 | Kim |
| 2002/0133481 A1 | 9/2002 | Smith |
| 2002/0143659 A1 | 10/2002 | Keezer |
| 2002/0147711 A1 | 10/2002 | Hattori et al. |
| 2002/0169754 A1 | 11/2002 | Mao |
| 2003/0018612 A1 | 1/2003 | Melbin |
| 2003/0028890 A1 | 2/2003 | Swart |
| 2003/0033298 A1 | 2/2003 | Sundaresan |
| 2003/0037074 A1 | 2/2003 | Dwork |
| 2003/0078914 A1 | 4/2003 | Witbrock |
| 2003/0120654 A1 | 6/2003 | Edlund |
| 2003/0149686 A1 | 8/2003 | Drissi |
| 2003/0229640 A1 | 12/2003 | Carlson |
| 2004/0024739 A1 | 2/2004 | Copperman |
| 2004/0039734 A1 | 2/2004 | Judd |
| 2004/0119740 A1 | 6/2004 | Chang |
| 2004/0122811 A1 | 6/2004 | Page |
| 2004/0153472 A1 | 8/2004 | Rieffanaugh |
| 2004/0186828 A1 | 9/2004 | Yadav |
| 2004/0215607 A1 | 10/2004 | Travis |
| 2005/0027670 A1 | 2/2005 | Petropoulos |
| 2005/0027687 A1 | 2/2005 | Nowitz |
| 2005/0027691 A1 | 2/2005 | Brin |
| 2005/0033803 A1 | 2/2005 | Vleet |
| 2005/0044070 A1 | 2/2005 | Nagata |
| 2005/0050014 A1 | 3/2005 | Gosse |
| 2005/0060311 A1 | 3/2005 | Tong |
| 2005/0071465 A1 | 3/2005 | Zeng |
| 2005/0131872 A1* | 6/2005 | Calbucci ............ G06F 17/30672 |
| 2005/0240570 A1 | 10/2005 | Ozbutun |
| 2005/0256848 A1 | 11/2005 | Alpert |
| 2006/0212429 A1 | 9/2006 | Bruno |
| 2006/0218114 A1 | 9/2006 | Weare |
| 2006/0224554 A1* | 10/2006 | Bailey ............ G06F 17/30864 |
| 2006/0230022 A1 | 10/2006 | Bailey |
| 2006/0294071 A1 | 12/2006 | Weare |
| 2007/0011154 A1 | 1/2007 | Musgrove |
| 2007/0088692 A1 | 4/2007 | Dean |
| 2007/0150800 A1 | 6/2007 | Betz |
| 2007/0203890 A1 | 8/2007 | Sareen |
| 2007/0208755 A1 | 9/2007 | Bhatkar et al. |
| 2008/0059416 A1* | 3/2008 | Forbes ............ G06F 17/30507 |
| 2008/0065632 A1 | 3/2008 | Nam |
| 2008/0082477 A1 | 4/2008 | Dominowska |
| 2008/0167973 A1 | 7/2008 | De |
| 2008/0263026 A1 | 10/2008 | Sasturkar |
| 2008/0313017 A1 | 12/2008 | Totten |
| 2009/0070284 A1 | 3/2009 | Tunstall-Pedoe |
| 2009/0089286 A1 | 4/2009 | Kumar |
| 2009/0210406 A1 | 8/2009 | Freire |
| 2010/0161385 A1 | 6/2010 | Karypis |
| 2011/0078193 A1 | 3/2011 | Chen |

OTHER PUBLICATIONS

Brin, S. et al., "The Anatomy of a Large-Scale Hypertextual Web Search Engine", Computer Science Department, 1998.

Sahami, M. et al., T. D. 2006. A web-based kernel function for measuring the similarity of short text snippets. In Proceedings of the 15th International Conference on World Wide Web (Edinburgh, Scotland, May 23-26, 2006). WWW '06. ACM Press, New York, NY, pp. 377-386.

Ricardo A. Baeza-Yates et al., The Intention Behind Web Queries. SPIRE, 2006, pp. 98-109, 2006.

Smith et al. "Leveraging the structure of the Semantic Web to enhance information retrieval for proteomics," vol. 23, Oct. 7, 2007, 7 pages.

International Preliminary Report on Patentability for PCT/US2004/029615.

International Search Report PCT/US2004/029615.

Robertson, S.E. "Documentation Note on Term Selection for Query Expansion" J. of Documentation, 46(4): Dec. 1990, pp. 359-364.

Talel Abdessalem, Bogdan Cautis, and Nora Derouiche. 2010. ObjectRunner: lightweight, targeted extraction and querying of structured web data. Proc. VLDB Endow. 3, 1-2 (Sep. 2010).

Jane Yung-jen Hsu and Wen-tau Yih. 1997. Template-based information mining from HTML documents. In Proceedings of the fourteenth national conference on artificial intelligence and ninth conference on Innovative application of artificial intelligence (AAAI'97/IAAI'97). AAAI Press, pp. 256-262.

Ganesh, Agarwal, Govind Kabra, and Kevin Chen-Chuan Chang. 2010. Towards rich query interpretation: walking back and forth for mining query templates. In Proceedings of the 19th international conference on World wide web (WWW '10). ACM, New York, NY USA, 1-10. DOI=10. 1145/1772690. 1772692 http://doi.acm.org/10.1145/1772690.1772692.

\* cited by examiner

QUERY AUGMENTATION

CROSS-REFERENCE TO RELATED APPLICATIONS

This application is a continuation application of, and claims priority to, U.S. patent application Ser. No. 12/404,424, titled "QUERY AUGMENTATION," filed on Mar. 16, 2009, which claims the benefit of U.S. Provisional Application No. 61/053,852, titled "Query Augmentation," filed on May 16, 2008, and U.S. Provisional Application No. 61/090,044, titled "Query Augmentation," filed on Aug. 19, 2008. The disclosure of each of the foregoing applications is incorporated herein by reference.

BACKGROUND

This specification relates to identifying augmentation queries and augmenting search operations.

The Internet provides access to a wide variety of content items, e.g., video and/or audio files, web pages for particular subjects, news articles, and so on. Content items of particular interest to a user can be identified by a search engine in response to a user query. One example search engine is the Google search engine provided by Google Inc. of Mountain View, Calif., U.S.A. The query can include one or more search terms or phrases, and the search engine can identify and, optionally, rank the content items based on the search terms or phrases in the query and present the content items to the user (e.g., in order according to the rank).

Often users provide queries that cause a search engine to return results that are not of interest to the users, or do not fully satisfy the users' need for information. Search engines may provide such results for a number of reasons, such as the query including terms having term weights that do not reflect the users' interest (e.g., in the case when a word in a query that is deemed most important by the users is attributed less weight by the search engine than other words in the query); the queries being a poor expression of the information needed; or the queries including misspelled words or unconventional terminology.

SUMMARY

In general, one aspect of the subject matter described in this specification can be embodied in methods that include the actions of identifying a first query stored in a query log; identifying a quality signal related to the first query, the quality signal being indicative of the performance of the first query in identifying information of interest to users for one or more instances of a first search operation in a search engine; determining whether the quality signal indicates that the first query exceeds a performance threshold; and storing the first query in an augmentation query data store if the quality signal indicates that the first query exceeds the performance threshold. Other embodiments of this aspect include corresponding systems, apparatus, and computer program products.

Another aspect of the subject matter described in this specification can be embodied in methods that include the actions of identifying structured document data in a document; generating a synthetic query from the structured document data; and storing the synthetic query in an augmentation query data store. Other embodiments of this aspect include corresponding systems, apparatus, and computer program products.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Overview

In general, the subject matter of this specification relates to identifying or generating augmentation queries, storing the augmentation queries, and identifying stored augmentation queries for use in augmenting user searches. An augmentation query can be a query that performs well in locating desirable documents identified in search results. The performance of the query can be determined from user interactions. For example, if many users that enter the same query often select one or more of the search results relevant to the query, that query may be designated an augmentation query.

In addition to actual queries submitted by users, augmentation queries can also include synthetic queries that are machine generated. For example, an augmentation query can be identified by mining a corpus of documents and identifying search terms for which popular documents are relevant. These popular documents can, for example, include documents that are often selected when presented as search results. Yet another way of identifying an augmentation query is mining structured data, e.g., business telephone listings, and identifying queries that include terms of the structured data, e.g., business names.

These augmentation queries can be stored in an augmentation query data store. When a user submits a search query to a search engine, the terms of the submitted query can be evaluated and matched to terms of the stored augmentation queries to select one or more similar augmentation queries.

The selected augmentation queries, in turn, can be used by the search engine to augment the search operation, thereby obtaining better search results. For example, search results obtained by a similar augmentation query can be presented to the user along with the search results obtained by the user query.

§1.1 Example Operating Environment

Figure 1:
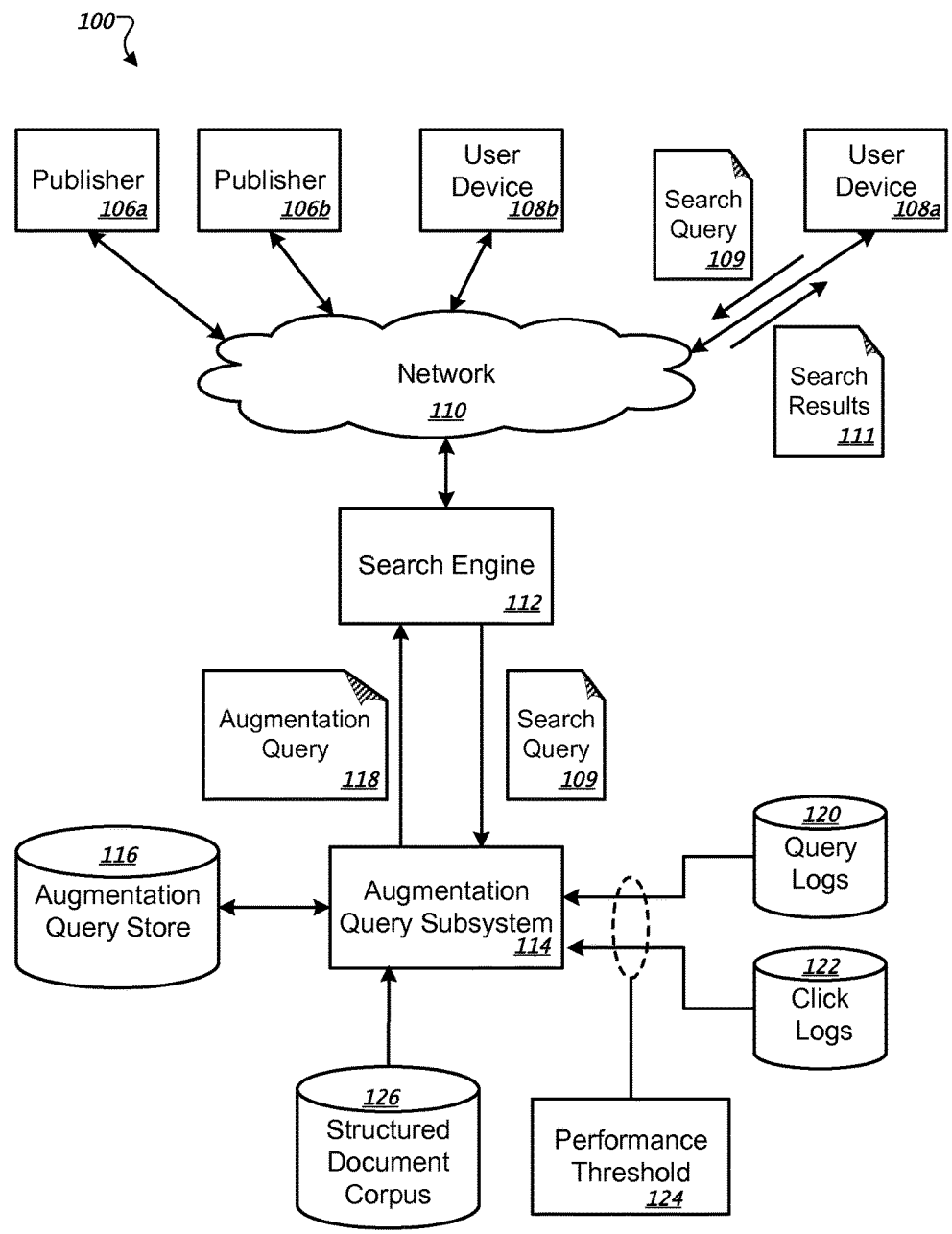
FIG. 1 is a block diagram of an example environment in which a query evaluation and query generation system can be implemented.

FIG. 1 is a block diagram of an example environment 100 in which a query evaluation and query generation system can be implemented. The online environment 100 can facilitate the identification of content items, e.g., web pages or other content indicated by search results to users. A computer network 110, such as a local area network (LAN), wide area network (WAN), the Internet, or a combination thereof, connects publishers 106a and 106b, user devices 108a and 108b and a search engine 112. Example user devices 108a and 108b include personal computers, mobile communication devices, television set-top boxes, etc. Although only two publishers (106a and 106b) and two user devices (108a and 108b) are shown, the online environment 100 may include many thousands of publishers and user devices.

§1.2 Search Processing

The publishers 106a and 106b can include general content servers that receive requests for content (e.g., web pages or documents related to articles, discussion threads, music, video, graphics, other web page listings, information feeds, product reviews, etc.), and retrieve the requested content in response to the request. For example, content servers related to news content providers, retailers, independent blogs, social network sites, products for sale, or any other entity that provides content over the network 110 can be a publisher.

A user device, such as user device 108a, can submit a search query 109 to the search engine 112. The search engine 112 performs a search operation that uses the search query 109 as input to identify search results responsive to the query, and the search results 111 are provided to the user device 108a. The search results 111 can include a link to web pages provided by the publishers 106a and 106b.

The search query 109 can include one or more search terms. A search term can, for example, include a keyword submitted as part of a search query to search engine 112 that is used to retrieve responsive search results.

To facilitate identification of the documents responsive to queries, the search engine 112 can index the content provided by the publishers 106 (e.g., an index of web pages) for later search and retrieval of documents that are relevant to the queries. These documents are identified in the form of search results. An exemplary search engine 112 is described in S. Brin and L. Page, "The Anatomy of a Large-Scale Hypertextual Search Engine," Seventh International World Wide Web Conference, Brisbane, Australia (1998) and in U.S. Pat. No. 6,285,999. A search result can include, for example, a web page title, snippets of text extracted from the web page, and hypertext link (e.g., a uniform resource locator) to the web page. The search results may be grouped into a predetermined number (e.g., ten) of search results on a search results page.

The search terms in the query 109 control the search results 111 that are identified by the search engine 112. Although the actual ranking of the search results 111 varies based on the ranking algorithm used by the search engine 112, the search engine 112 can retrieve and rank search results based on the search terms submitted through a search query.

In some implementations, the search engine 112 utilizes different information from the query 109 and from prospective results to rank the search results 111. Such information may include, for example, identifiers related to the search results 111 (e.g., document identifiers), scores related to the search results 111 (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores, etc.

§1.3 Augmentation Query Subsystem

Often users provide queries that cause a search engine 112 to return results that are not of interest to the users, or do not fully satisfy the users' need for information. Queries can exhibit such poor performance due to a number of reasons, such as the query including terms having term weights that do not reflect the users' interest (e.g., in the case when a word in a query that is deemed most important by the user is attributed less weight by the search engine than other words in the query); the query is a poor expression of the information needed; or the query includes misspelled words or unconventional terminology. Thus, an augmentation query subsystem 114 can be used to perform search operations that augment the search operation for an original search query.

When the user device 108a submits the search query 109, the search engine 112 can forward the search query 109 to the augmentation query subsystem 114 for evaluation. The augmentation query subsystem 114 then parses the search terms in the search query 109 and compares the parsed terms to queries stored in an augmentation query store 116 that stores augmentation queries. The augmentation queries can be queries submitted by users and that have been identified as performing well, or machine-generated synthetic queries that are expected to perform well and/or that have been pre-associated with search results and/or documents independent of the performance of the synthetic queries. The augmentation query subsystem 114 can then identify one or more relevant augmentation queries that can be used in addition to the submitted query to perform an augmented search operation to augment the search results provided to the user.

The augmentation query subsystem 114 uses the augmentation query 118 to perform an augmented search operation for the search query 109. The results of the augmented search operation can be provided to the user device that submitted the query 109. In some implementations, the augmented search operation provides additional search results identified by the augmentation query to the user. For example, the search engine 112 can provide, within the search results 111, additional result items related to the augmentation query 118 to the user. In other implementations, the augmented search operation can adjust the rankings of search results identified by the search query 109, and the adjusted search results are provided to the user device. In other implementations, the augmented search operation can provide a selectable link to another page to the user device. When the link is selected, the search results specific to the augmentation query are displayed on the user device. Other augmented search operations can also be performed.

To obtain augmentation queries, the augmentation query subsystem 114 can examine performance data indicative of user interactions to identify queries that perform well in locating desirable search results. For example, augmentation queries can be identified by mining query logs 120 and click logs 122. Using the query logs 120, for example, the augmentation query subsystem 114 can identify common user queries. The click logs 122 can be used to identify which user queries perform best, as indicated by the number of clicks associated with each query. The augmentation query subsystem 114 stores the augmentation queries mined from the query logs 120 and/or the click logs 122 in the augmentation query store 116.

In some implementations, implicit signals of query quality are used to determine if a query can be used as an augmentation query. An implicit signal is a signal based on user actions in response to the query. Example implicit signals can include click-through rates (CTR) related to different user queries, long click metrics, and/or click-through reversions, as recorded within the click logs 122. A click-through for a query can occur, for example, when a user of a user device, selects or "clicks" on a search result returned by search engine 112. The CTR is obtained by dividing the number of users that clicked on a search result by the number of times the query was submitted. For example, if a query is input 100 times, and 80 persons click on a search result, then the CTR for that query is 80%.

A long click occurs when a user, after clicking on a search result, dwells on the landing page (i.e., the document to which the search result links) of the search result or clicks on additional links that are present on the landing page. A long click can be interpreted as a signal that the query identified information that the user deemed to be interesting, as the user either spent a certain amount of time on the landing page or found addition items of interest on the landing page.

A click-through reversion (also known as a "short click") occurs when a user, after clicking on a search result and being provided the referenced document, quickly returns to the search results page from the referenced document. A click-through reversion can be interpreted as a signal that the query did not identify information that the user deemed to be interesting, as the user quickly returned to the search results page.

These example implicit signals can be aggregated for each query, such as by collecting statistics for multiple instances of use of the query in search operations, and can further be used to compute an overall performance score. For example, a query having a high CTR, many long clicks, and few click-through reversions would likely have a high performance score; conversely, a query having a low CTR, few long clicks, and many click-through reversions would likely have a low performance score.

The three example implicit signals are not an exhaustive list of implicit signals. Other implicit signals can also be used.

In some implementations, a performance threshold 124 indicative of a performance level can optionally be applied to the query data mined from the query logs 120 and/or the click logs 122 to select augmentation queries from the query and click through records. For example, a performance metric for each query can be measured from the implicit signals. The performance threshold 124 can ensure that only those queries having performance scores meeting or exceeding a performance level are selected from the query logs 120.

Synthetic augmentation queries can also contribute to the augmentation query store 116. The augmentation query subsystem 114 can mine data from a structured document corpus 126 to generate synthetic augmentation queries. For example, business information listings, document titles and/or anchor text found within the documents, and/or other descriptive structured data can be used to generate queries which will perform well when searching the items described. In some implementations, the synthetic augmentation queries can be differentiated (e.g., flagged or stored separately) from user-generated augmentation queries within the augmentation query store 116.

The augmentation query subsystem 114 can be realized by instructions that upon execution cause one or more processing devices to carry out the processes and functions described above and in more detail below. Aspects of the augmentation query subsystem 114 are described in detail below. The implementations described below are examples, and other implementations can also be used. For example, other software architectures or functional allocations can be used.

§2.0 Augmentation Query Identification and Generation

Figure 2A:
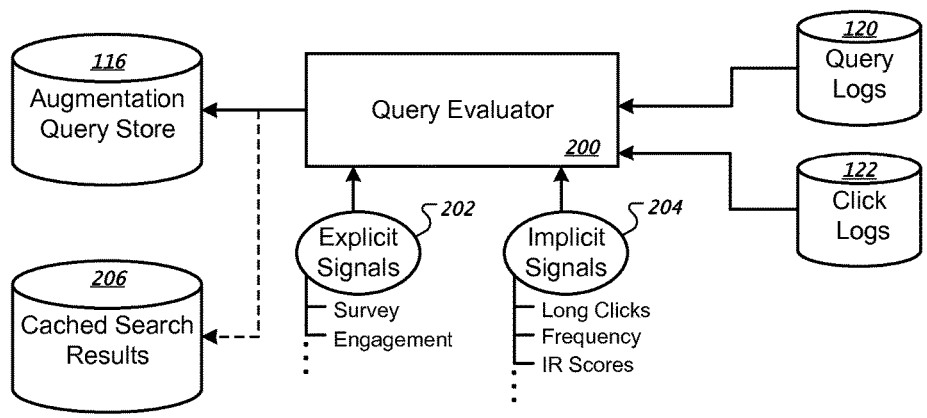
FIG. 2A is a block diagram of an example query evaluator that selects augmentation queries from search engine data.
Figure 2B:
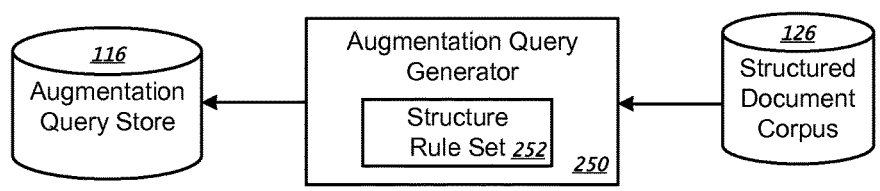
FIG. 2B is a block diagram of an example query generator that generates augmentation queries from a structured document corpus.

Augmentation queries, for use in augmenting a user-requested search, can be selected from previously submitted user queries or automatically generated based upon formatted data. FIGS. 2A and 2B illustrate systems that identify augmentation queries and that generate synthetic augmentation queries, respectively.

§2.1 Augmentation Query Identification

FIG. 2A is a block diagram of an example query evaluator 200 that selects augmentation queries from search engine data. The search engine data can include the query logs 120 and the click logs 122. To evaluate the performance of the queries in the query logs 120 and the click logs 122, the query evaluator 200 evaluates quality signals that include explicit signals 202 and/or implicit signals 204 associated with or derived from the individual query records. The query evaluator 200 populates the augmentation query store 116 with well-performing queries derived from the query logs 120 and the click logs 122. In determining the criteria for well-performing queries, in some implementations, the query evaluator 200 compares query performance metrics derived from the query logs 120 and the click logs 122 and applies a performance threshold (e.g., the performance threshold 124 of FIG. 1) to the candidate query.

The query evaluator 200 can use any method of evaluating query performance. In some implementations, the query logs 120 and/or the click logs 122 can contain explicit signals 202 regarding the performance of the query submitted. Explicit signals 202 represent user feedback regarding the performance of a query. For example, after the search engine 112 processes a user-submitted query, the query evaluator 200 can provide a brief survey regarding the relevance of the search results. The brief survey can be presented on a random basis, and can, for example, request the user to rate the performance of the query. Example surveys can include positive and negative rating selections, such as binary rankings of "Good" and "Bad," or can include a Likert scale rating, such as a ranking scale of 1-5, or other type of psychometric rating scales.

In some implementations, the query evaluator 200 provides a rating item alongside each item in the search result list 111. The user can select the rating item and indicate whether or not the user found the item to be relevant to the user's interests.

These explicit user signals 202 can be stored and associated with queries submitted by the users. Thereafter, the performance of the queries can be weighed according to the explicit user signals 202 when determining whether a user query meets the performance threshold 124.

In other implementations, the query logs 120 and the click logs 122 are evaluated for implicit signals 204 regarding the performance of the query submitted. Implicit signals 204 represent user interactions that can be used to infer the performance of a query. The click logs 122, in one example, can contain data representing the length of time a user spent reviewing a document referenced by a search result after selecting the search result. A long click can result when a user reviews a referenced document for a length of time above a set threshold value; or clicks through the search result without returning to the search session; or clicks on other pages linked from the referenced document. The query evaluator 200 can consider a long click value to be indicative of a well performing query. Conversely, a click-through reversion can be interpreted as a signal that user did not find the particular search result to be relevant, and thus be indicative of poor query performance.

Data indicative of the implicit user signals 204 can be stored and associated with queries submitted by the users. Thereafter, the performance of the queries can be weighted according to the implicit user signals 204 data when determining whether the user query meets the performance threshold 124.

The frequency of a particular query within the query logs 120 can also be used to select a well-performing query. For example, if many users submit the query "environmentally friendly vehicle", the query evaluator 200 can infer that this is a well-performing search query. The frequency criteria for a well-performing query can vary. In some implementations, the threshold can be a number of submissions, e.g., any query that was submitted at least a 100 times within a 24-hour period; or can be a normalized submission value, e.g., any query having a normalized submission value of 0.5 relative to a most frequently submitted query having a normalized submission value of 1.0. Other query performance metrics can be used, including averaging relevancy scores (e.g., IR scores) of a subset of highest ranked results and determining if the average relevancy scores exceeds a threshold value; or averaging anchor text (AT) scores (such as a relevance score that measures the relevance of the query to the text in a hyperlink) and determining if the averaged AT scores exceeds a threshold value.

The query evaluator 200 stores the well-performing queries in the augmentation query store 116. In some implementations, the query evaluator 200 can determine a performance ranking for each query within the augmentation query store 116 (e.g., based upon the explicit signals 202 and/or the implicit signals 204) and store the performance ranking in the augmentation query store 116. The performance ranking can be used in the selection of augmentation queries as described in Section 3.0 below.

In some implementations, the query evaluator 200 can further process the augmentation queries by clustering the queries according to topic similarities or performance similarities. For example, the query evaluator 200 can evaluate the similarity of a group of queries and cluster those that are syntactically and/or semantically most similar; or can cluster queries by edit distance; or can cluster queries that cause the search engine 112 to identify similar search results. Other clustering criteria can also be used. The clustering can further facilitate the selection of augmentation queries, as described below.

The query evaluator 200 can optionally execute the well-performing queries (e.g., using the search engine 112) and store the search results obtained in a cached search results store 206. The search results can be cached so that the search engine 112 need not execute additional searches for a selected augmentation query in response to receiving a search query 109. For each augmentation query, the cached search results can, for example, include a subset of all search results that are identified by the search engine 112. The cached search results can thus be limited to the most relevant search results for each query, e.g., the top 10 ranked search results. The cached search results associated with each augmentation query within the augmentation query store 116 can, for example, be updated on a regular basis (e.g., every 48 hours for all queries; or after predetermined time periods based on categories, such as 12 hours for news-related queries and 48 hours for other categories, such as computer games; or after an incremental threshold number of new queries, e.g., 10,000,000, are received after a most recent update) to ensure up-to-date result lists. When a user later submits a query to the search engine, the query can be evaluated to locate similar queries within the augmentation query store 116, and the search results obtained by the user's query can be augmented with the cached search results corresponding to one or more well-performing queries similar to the user query.

In another implementation, the query evaluator 200 can identify from the query logs 120 and click logs 122 search results that were identified when the well-performing queries were initially entered by users, and store the identified search results in the cached search results store 206. These actual search results can then be accessed by the query evaluator 200 by use of the query logs 120 and click logs 122. Thus, when a well-performing query is selected as an augmentation query, the search results that are identified in the query logs 120 and the click logs 122 can be accessed and used as search results to augment the search results obtained by the user's query.

§2.2 Augmentation Query Generator

FIG. 2B is an example augmentation query generator 250 that generates augmentation queries from a structured document corpus 126. The structured document corpus 126 can include documents that are usually arranged according to an identifiable structure, such as company web pages; telephone listings; governmental agency pages; on-line information repositories, and so on. The augmentation query generator 250 can be configured to identify sections of the documents defined by the document structure, such as titles and anchor text that are specified by HTML tags, or address listings offset specified by address fields, and so on.

Queries that contain information often found in structured documents, such as a business name, city name, and state name, can be interpreted as a signal that the user is trying to find information that is commonly stored in the structured data, such as phone listings, address listings, and public filings. Synthetic queries that are similarly structured can thus generate relevant results from such structured data. By mining documents that include formatted data such as entity name listings, phone numbers, and address information, the query generator 250 can create synthetic queries that will likely perform well. Such synthetic queries may not otherwise be present in the query logs 120.

In some implementations, the query generator 250 uses a structure rule set 252 to create a set of synthetic queries based upon the data located within the structured document corpus 126. These synthetic queries can then be stored in the augmentation query store 116 for use in augmenting user queries submitted to a search engine.

The structure rule set 252 can, for example, include instructions that cause the query generator 250 to locate data within the structured document corpus 126. In one example, the structure rule set 252 can include instructions governing collection of the business name, city, and state information from a list of businesses in public listings. For example, the instructions can define the synthetic query to be structured in the order of the business name, then city, then state, and can define where in the structured document corpus 126 of this information can be found. The instructions can additionally include stop words to discard from the beginning and/or end of a business name (e.g., "the", "inc.", "co.", "ltd", etc.), and can also insert query operators that modify a search. These query operators are operators that are defined by the search engine, and the instructions can define that synthetic queries include such operators when the appropriate parameters for the operators are present in the structured data. For example, the business listing "The Basket Weavers, Inc., 123 Main Street, Chicago, Ill." could result in the synthetic query "Basket Weavers AND ADR=123 Main Street AND Chicago. The operators AND and ADR are query operators that require the search result to include an address listing of "123 Main Street." Alternatively, the synthetic queries can also be generated without these operators, such as a query "Basket Weavers 123 Main Street Chicago."

In some implementations, multiple synthetic query variants can be generated from the structured data. For example, structured data, such as on-line telephone listings, could include the following fields and data:

| TABLE FIELD | TABLE DATA |
| --- | --- |
| Business Name | Dental Health Center |
| Address | Hyde Park, NY |
| Website | www.exampledentalheathctr.com |
| Category | dentistry |

Potential synthetic queries derived from the preceding data set could be "Dental Health Center Hyde Park N.Y.", "dentistry Hyde Park N.Y." and "Dental Health Center NY", etc.

In some implementations, synthetic queries can also be generated from particular sections of the documents. Sections of the documents that can be used to generate synthetic queries include, for example, document titles and anchor text.

Often a document title is descriptive of the content of a document, and if a user submits the title as a search query, the search engine 112 will likely return the document with that title. Thus, a document title can be considered a well-performing query, even if the title has never been submitted by a user. Accordingly, the augmentation query generator 250 can store the document title as an augmentation query in the augmentation query store 116.

Anchor text can also be representative of a particular document. For example, if the document corpus 126 includes many documents that have anchors with the same text reference to the same target document, then this anchor text is a signal that is representative of the target document and can be stored as synthetic query. For example, if the number of pages exceeding a threshold number, e.g., 500, include the text "article on predicting widget failures", e.g., "Click here for an article on predicting widget failures" or "Here is a good article on predicting widget failures", then the anchor text "article on predicting widget failures" can be selected as a synthetic query by the augmentation query generator 250 and stored in the augmentation query store 116.

In some implementations, the synthetic queries need not be well-performing queries. For example, the home page of The Basket Weavers, Inc., may not include the address "123 Main Street, Chicago, Ill." Thus, if the search engine 112 were to process the synthetic query "Basket Weavers 123 Main Street Chicago", the home page of this company may not be identified as a search result, or may be ranked relatively low with respect to other search results. Accordingly, the augmentation query generator 250 can associate the synthetic query with the home page of the company, i.e., can identify the home page of the company as a highly relevant search result for the synthetic query independent of any relevance measure determined by the search engine 112.

In some implementations, the augmentation query generator 250 associates the synthetic query with one or more documents based on one or more signals that the documents are highly relevant to the subject matter related to the synthetic query. For example, the augmentation query generator 250 can identify a company name in the URL domain name to locate the main web page of the company. The company web page at the top level of the URL can then be associated with the synthetic query, even if that web page does not include all of the address information in the synthetic query. Thus, if the company Basket Weavers Inc. has a web page at the resource location www.example.basketweavers.com, the web page at the resource location can be associated with a synthetic query. Accordingly, when a user enters a similar query, e.g., "Basket Weavers in Chicago, at 123 Main Street" or "Basket store at 123 Main Street, Chicago", the query will be matched to the synthetic query stored in the augmentation query store 116, and a resulting augmented search operation will identify the home page of the company as a search result that is responsive to the user query.

In some implementations, the presence of a company name in a portion of the URL that is not the domain name can also be used to associate the resource at the URL with the synthetic query. For example, the company Basket Weavers Inc. may have a web page at the "www.examplebusinesslistings.com/Basket_Weavers.html". The presence of the terms Basket and Weavers in the URL will cause the augmentation query generator 250 to associate the resource at "www.examplebusinesslistings.com/Basket_Weavers.html" with the synthetic query.

In some implementations, the augmentation query generator 250 can identify a URL from a listing of structured data and associate the URL with a synthetic query. For example, a document may list companies and their associated web page URLs, or other URLs that include relevant information about that company. The augmentation query generator 250 can generate a synthetic query that includes the company name, and associate the URLs with the synthetic query for inclusion in search results for the synthetic query. This association identifies the resources at the URLs for being referenced in the search results for the synthetic query.

Similar associations of documents with synthetic queries that may not actually be determined by the search engine 112 to be highly relevant to the documents can also be done by the augmentation query generator 250. For example, a synthetic query based on anchor text and processed by the search engine 112 as a query may not identify the target document as a highly relevant search result, or may not even identify the target document as a search result. However, the anchor text of the link is a signal of how users actually describe the subject matter of the document to which the link refers, and if the anchor text linking to that document occurs frequently, e.g., in excess of a threshold number, the augmentation query generator 250 can generate a synthetic query based on the anchor text and associate the document with the anchor text. Thus, when a user enters a query that is similar to the anchor text, the query will be matched to the synthetic query stored in the augmentation query store 116, and a resulting augmented search operation will identify the web page that is referenced by the links that include this anchor text.

When storing the synthetic queries within the augmentation query store 116, in some implementations, the query generator 250 can flag the synthetic queries as being machine-generated. The flagging can cause the synthetic queries to be used more frequently or less frequently, depending on the user submitted search query. For example, a synthetic query can be downgraded, e.g., its performance ranking reduced, in relation to a submitted query (e.g., query 109) that signals that the user is searching for general information, so that the user-generated augmentation query are more likely to be used to augment search results. Thus, if a user enters a query "Pizza restaurant reviews", other user-submitted augmentation queries related to Pizza reviews are more likely to be selected.

Conversely, a synthetic query can be upgraded, e.g., its performance ranking increased, in relation to a submitted query (e.g., query 109) that signals that the user is searching for specific information, so that the synthetic query is more likely to be used to augment search results. Thus, if a user enters a query "The Big House of Pizza", which is an example business name, a synthetic query based on structured documents relating to a business entity named "The Big House of Pizza" is more likely to be used to augment the search results.

§3.0 Augmentation Query Processing

Figure 3:
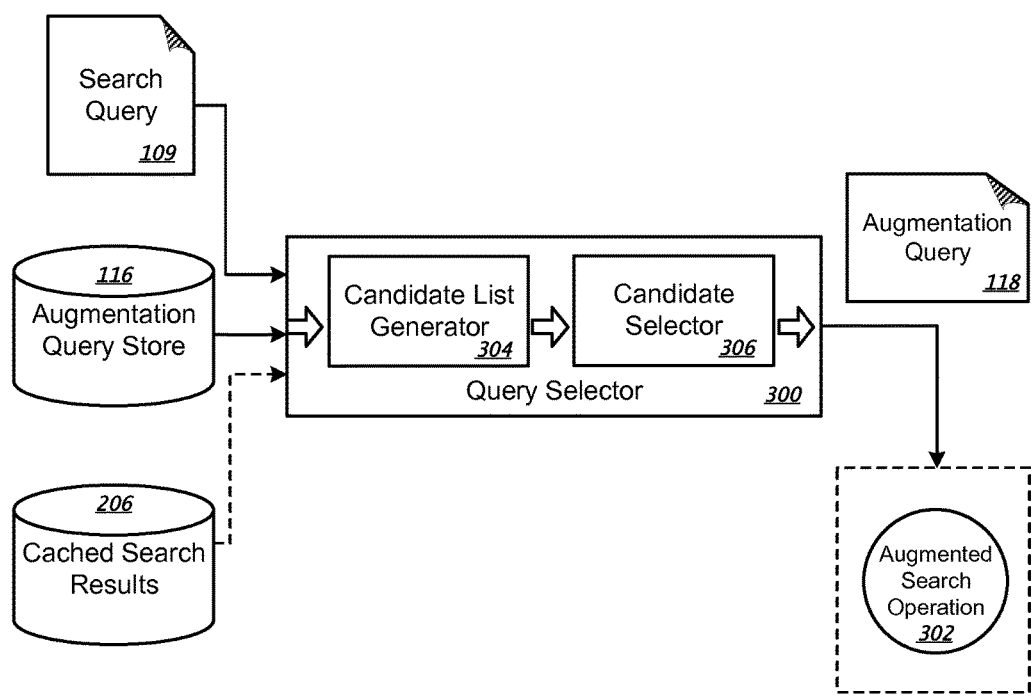
FIG. 3 is a block diagram of an example query selector that selects augmentation queries from an augmentation query store.

FIG. 3 is a block diagram of an example query selector 300 that selects augmentation queries from an augmentation query store 116. The query selector 300 performs an augmented search operation 302 using the selected augmentation query (or augmentation queries) based upon the user-submitted search query 109. The augmented search operation 302 can, for example, use the augmentation query 118 (or augmentation queries, if more than one is selected as input to an augmented search operation 302) to identify additional search results that are provided with the search results identified using the query 109; or can adjust the rankings of search results identified by the search query 109; or can promote search results that are identified by both the augmentation query and the search query 109; or can provide a selectable link to another page that lists only the search results specific to the augmentation. Other augmented search operations can also be performed.

§3.1 Augmentation Query Overview

In response to receiving a query 109, the query selector 300 identifies a candidate list of candidate augmentation queries from the augmentation query store 116 and ranks the candidate augmentation queries according to their similarity to the received query 109. The received query 109 can be a query that has been previously processed by the query selector 300, or can be a query that has not been processed before, i.e., a new query. The query selector 300 then selects one or more of the highest ranked queries, e.g., the augmentation queries that are most similar to the query 109, and performs augmented search operation that uses the selected augmentation queries as input.

§3.2 Identification of Candidate Augmentation Queries

When the query selector 300 receives the search query 109 (e.g., from the search engine 112 of FIG. 1), a candidate list generator 304 parses the search terms of the query 109. The parsing includes identifying individual query terms, and can also include identifying phrase (e.g., "If the shoe fits"), nouns and noun phrases (e.g., "White House"), adjectives, adverbs, etc. The candidate list generator 304 then compares a subset of the search terms and/or variations of the search terms against the queries within the augmentation query store 116 to locate queries similar to the query 109.

In some implementations, the terms of the query 109 can be compared to each query in the augmentation query store 116 and the most similar augmentation queries can be identified as candidate augmentation queries. For example, an edit distance from the user-submitted query to each query in the augmentation query store 116 can be determined, and a subset of the augmentation queries with smallest edit distances can be selected as candidate augmentation queries.

Because the augmentation query store 116 may store hundreds of thousands, or even millions of queries, implementing a search in which every query is evaluated against the submitted query can require significant processing resources. Thus, in some implementations, the candidate list generator 304 implements a constrained search of the augmentation query store 116 to identify candidate augmentation queries. For example, the augmentation queries in the augmentation query store 116 can be indexed, and any augmentation query that includes one or more terms of the search query 109 can be selected as a candidate augmentation query. Other constrained searches can also be used. For example, for a multi-term query 109, the candidate list generator 304 can identify queries within the augmentation query store 116 that include a subset of the search terms within the search query 109 (e.g., at least two of the terms contained within the query 109). For example, if the query selector 300 received the query 109 with profession and location information of "orthodontist dentist San Francisco Calif.", the candidate list generator 304 may match any augmentation query that contains "orthodontist San Francisco Calif." and/or "dentist San Francisco Calif.".

In some implementations, the candidate list generator 304 can transform one or more search terms in a way designed to preserve the meaning of the query 109 (e.g., using synonyms or stem reduction), and the transformed query can be used to search the augmentation query store 116. A variety of processes can be used to transform queries. For example, the candidate list generator 304 can replace one or more search terms with synonyms, e.g., "dental surgeon San Francisco Calif." where "dental surgeon" is substituted for "orthodontist dentist."

§3.3 Selection of Augmentation Queries from the Candidate Augmentation Queries

The candidate list generator 304 compares the search terms within the query 109 and any number of permutations of the search terms to queries stored in the augmentation query store 116 to identify a list of candidate queries and provides the identified candidate augmentation queries to a candidate selector 306. The candidate selector 306 determines one or more best-related and/or best-performing queries from the list of candidate queries.

In some implementations, the candidate selector 306 applies a transformation cost and/or transformation rule to each query in the candidate query list to measure the amount of term transformation or limit the amount of term transformation between the augmentation query and the query 109. The transformation cost can be based on edit distances, synonym substitution, and other language model metrics, and can be represented by a numeric value, a vector, or some other parameter. For example, starting with the query "Halloween outfit for man", a transformation cost of the candidate query "Halloween men's costume" would be based upon the synonym replacement of "costume" for "outfit" and the replacement of "men's" for "man," and on the edit distance between those terms. In some implementations, the edit distance cost can be discounted or ignored if a synonym score (e.g., a measure representing the similarity of meaning of the terms that are deemed synonyms) is high.

In some implementations, the transformation cost can also be based on the performance ratings of the candidate augmentation queries. For example, assume two candidate augmentation queries for the query "Halloween outfit for man" are "Halloween men's costume" and "Men's Halloween outfits," and that the performance ranking of "Halloween men's costume" is higher than "Men's Halloween outfits." While the edit distance and synonym cost of "Men's Halloween outfits" may be less than the edit distance and synonym cost of "Halloween men's costume," the higher performance ranking of "Halloween men's costume" may result in that query being selected over "Men's Halloween outfits."

Other types of transformation costs and/or transformation rules can also be defined and used. For example, the candidate selector 306 can, in some implementations, recognize term co-occurrences in the query 109. For example, "San Francisco Calif." can be reduced with little or no transformation cost to "San Francisco", because the CA in this case can be considered redundant.

Similarly, in some implementations, the transformation cost of a term can be based on the context of the term in the query. For example, the transformation cost of location terms can be relatively high or relatively low. For example, for the queries "Brooklyn pizza" and "Brooklyn Dodgers", the transformation cost associated with "Brooklyn" may be higher for "Brooklyn pizza" than for "Brooklyn Dodgers". As the term "pizza" is a general term, the term "Brooklyn" may be indicative of a signal that the user is searching for pizza restaurants in Brooklyn. Conversely, the term "Dodgers" is a specific sports term, and thus the term may be indicative of a signal that the user is searching for information about the "Dodgers" baseball team. Because this baseball team relocated to Los Angeles, there can be a low transformation cost for transforming "Brooklyn" to "Los Angeles." As a further example, if the context of the query including "Brooklyn Dodgers" is more strongly indicative of a historical context, e.g., "Brooklyn Dodgers History" the transformation cost of "Brooklyn" can be higher than the transformation cost for that same term in the query "Brooklyn Dodgers."

Transformation costs can also be based in part upon the relative importance of a term within the query, such as may be indicated by term weights. For example, nouns may be weighted more heavily in importance than verbs and adjectives within a query. When evaluating a candidate query against the query 109 "child in yellow rain slicker jumping in puddles", transformations of the terms "yellow" and "jumping" may yield a lower transformation cost than transforming the terms "child", "slicker", or "puddles".

In some implementations, the candidate selector 306 can assign an order of importance to query terms in the query 109 for preserving the meaning of the query 109. For example, the candidate selector 306 can include a set of names that should not be transformed (e.g., product names, brand names, famous people, or organizations). Additionally or alternatively, in some implementations, the set of names can include compound synonyms. For example, if the query 109 includes the phrase "United States President", a candidate query including the name of a current president, e.g. "George W. Bush", may have a minor transformation cost applied.

Example transformation rules can include preservation guidelines (e.g., location names, or names of people) and the order in which to drop terms by type (e.g., verbs or adjectives are to be dropped before nouns).

In some implementations, a high transformation cost can be assigned for transforms of terms that frequently occur in the augmentation queries of the augmentation query store 116. For example, a popular band name, e.g., "Staind," may be identified as a frequently occurring term within well-performing queries. Thus, while the term "Staind" has a close edit distance to the word "stained," the transformation cost of the term "Staind" would nevertheless be relatively high due to its term frequency and performance.

Other information can also be used to rank queries. For example, the location of the user device that submitted a query, such as a city in California, can be used to rank candidate queries, such as ranking queries that contain colloquial California terms higher that queries that do not use such terms. The language of the query can be used to rank candidate queries.

Other selection processes in addition to transformation costs can also be used to select from the candidate augmentation queries. For example, in some implementations, the candidate selector 306 can compare the search results of the query 109 to respective search results of each of the candidate queries (e.g., as stored within the cached search results 206) to determine which candidate query has associated search results that are most similar to the results for the original user query 109. For example, if the query "cheap used car parts" shares a greater number of search result hits with "bargain used auto parts" than does the query "cheap used auto parts", the candidate selector 306 can select the candidate query "cheap used car parts" over "cheap used auto parts".

In some implementations, the candidate augmentation query that is ranked highest based on the transformation cost and/or other selection criteria, such as search result similarity, can be selected for performing the augmented search operation. In other implementations, rather than selecting one of the candidate augmentation queries, the candidate selector 306 can select all of the candidate augmentation queries that meet a threshold (e.g., a query similarity threshold score, or a query and search result similarity threshold).

The processes described above can be used to measure the similarity of queries on a term-by-term basis, on a compound term basis, on an entire query basis, or combinations thereof. For example, each term of a query in the augmentation query store 116 can be compared to the terms of a received query and synonym scores for each term can be generated. The synonym scores can then be used to compute an overall similarity score to the received query based on a function of the component synonym scores. Example functions can include central tendency calculations, logarithmic multiplications, or other functions that can be used to calculate a measured value.

The processes described above can also be use separately or in conjunction with one or more other processes. For example, transformation costs based only on synonym analysis can be used. Alternatively, transformation costs based on synonym analysis and frequency term analysis can be used.

§3.4 Search Augmentation

Once one or more candidate queries have been selected, the query selector 300 performs an augmented search operation 302 using the selected candidate queries as input. In some implementations, the augmented search operation 302 augments search results relevant to the user query 109, and this augmented set of search results can be provided to the user device that provided the search query. The search results generated by the query 109 can be augmented in a number of ways depending upon the implementation and/or the relative success of the query matching done by the query selector 300. In some implementations, a portion of the search results associated with the query or queries selected by the candidate selector 306 (e.g., retrieved from the cached search results 206 or generated real-time using the search engine 112) are added to the search result list generated for the query 109. For example, the candidate query search results can be appended to the user search results or interspersed with the user search results based upon ranking.

In some implementations, the search results for the selected augmentation query can be differentiated from the search results for the user query by use of visual indicator data. For example, the search results for the candidate augmentation query can be marked with a visual indicator (e.g., highlighted, icon, link available for the user to view the extra results, etc.), or a link to a second search results page that presents the search results for the selected augmentation query can be provided. In other implementations, search results that occur within both the search results for the selected augmentation query and the user query can be promoted accordingly in the result presented to the user.

If no results are found with search query 109, in some implementations, the augmented search operation can present search results for the selected augmentation queries with an indication that a modification to the search had been made.

For augmentation queries that are synthetic queries, the search results can also include search results that were associated with the synthetic queries by the augmentation query generator 250. In some implementations, these associated search results are associated independent of the performance of the synthetic queries, e.g., independent of any relevance measure of the synthetic queries to the associated pages determined by the search engine 112.

The example augmented search operations described above are not an exhaustive list, and other augmented search operations can also be used. Additionally, the augmented search operation need not provide additional search results. For example, the augmented search operation 302 may result in offering one or more similar candidate augmentation queries as suggestions on the search results page for the query 109, or may offer many suggestions for a query 109 having very few or no results.

§4.0 Augmentation Query Processes

Figure 4:
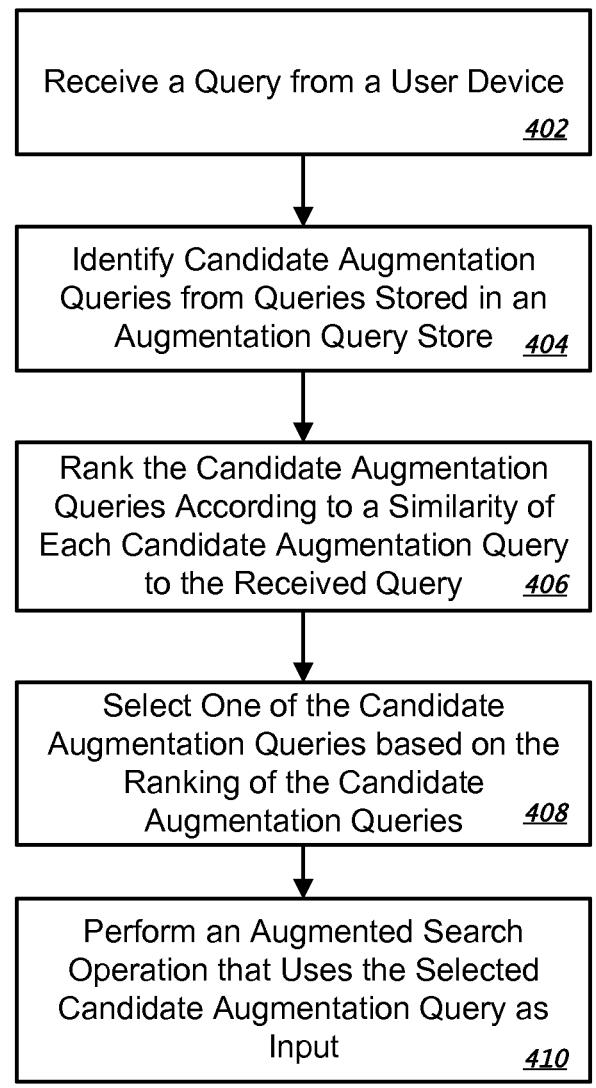
FIG. 4 is a flow diagram of an example process for selecting augmentation queries and performing an augmented search operation.

FIG. 4 is an example flow diagram of a process 400 for selecting augmentation queries and performing an augmented search operation. The process 400 can, for example, be implemented in the augmentation query subsystem 114 of FIG. 1, or in the query selector 300 of FIG. 3.

The process 400 receives a query from a user device (402). For example, the augmentation query subsystem 114 of FIG. 1 or the query selector 300 of FIG. 3 can receive the query 109 from the user device 108a over the network 110 and the search engine 112. The query 109 can include any number of search terms.

The process 400 identifies one or more augmentation queries from queries stored in an augmentation query store (404). For example, the augmentation query subsystem 114 of FIG. 1 or the candidate list generator 304 of FIG. 3 can compare a subset of the terms within the query 109 to the augmentation queries stored within the augmentation query store 116. One or more candidate augmentation queries are selected from the augmentation query store 116 based upon their similarity to the query 109.

The process 400 ranks the candidate augmentation queries according to a similarity of each candidate augmentation query to the received query (406). For example, the augmentation query subsystem 114 of FIG. 1 or the candidate selector 306 of FIG. 3 can evaluate the similarity of the candidate augmentation queries to the query 109 and apply a similarity score between the two sets of search terms. In some implementations, a synonym score, an edit distance score, and/or a transformation cost score can be applied to each candidate augmentation query. Similarity scores can also be determined based on the similarity of search results of the candidate augmentation queries to the search query 109. In other implementations, the synonym scores, edit distance scores, and other type of similarity scores can be applied on a term by term basis for terms in search queries that are being compared. These scores can then be used to compute an overall similarity score between two queries. For example, the scores can be averaged; the scores can be added; or the scores can be weighted according to the word structure (nouns weighted more than adjectives, for example) and averaged. The candidate augmentation queries can then be ranked based upon relative similarity scores.

The process 400 selects one of the candidate augmentation queries based on the ranking of the candidate augmentation queries (408). For example, the augmentation query subsystem 114 of FIG. 1 or the candidate selector 306 of FIG. 3 can select the top ranking query from the identified augmentation queries. In other implementations, all candidate augmentation queries having a similarity score exceeding a similarity threshold can be selected.

The process 400 performs an augmented search operation that uses the selected candidate augmentation query as input (410). For example, the augmentation query subsystem 114 of FIG. 1 or the query selector 300 of FIG. 3 can execute the augmented search operation 302 to enhance the search results obtained by the query 109. In some implementations, the search results associated with the candidate augmentation query selected can be retrieved from the cached search results 206 and provided to the user device. In other implementations, the candidate query can be used as input to the search engine 112 to execute a separate search operation to obtain search results. The augmented search operation 302 can also include appending or interspersing the augmentation query search results with the user query search results or providing the user with a selectable link to obtain the search results related to the augmentation query.

Figure 5:
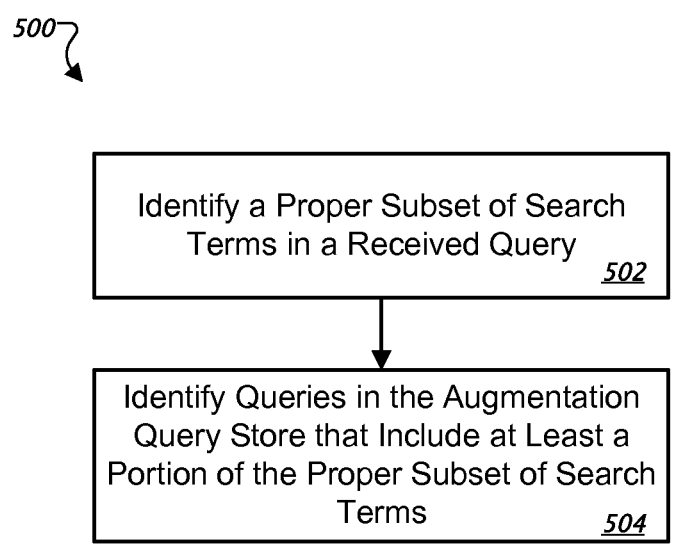
FIG. 5 is a flow diagram of an example process for identifying candidate augmentation queries.

FIG. 5 is a flow diagram of an example process 500 for identifying candidate augmentation queries. The process 500 can, for example, be implemented in the augmentation query subsystem 114 of FIG. 1, or in the candidate list generator 304 of FIG. 3.

The process 500 identifies a proper subset of search terms in a received query (502). For example, the augmentation query subsystem 114 of FIG. 1 or the candidate list generator 304 of FIG. 3 can identify key search terms within the query 109. The key search terms, for example, can include nouns, location information, and commonly occurring terms (e.g., tourist destinations, pop culture icons, or brand names). In another example, unnecessary terms can be dropped from the user query 109 (e.g., stop words such as "the" or "where").

The process 500 identifies one or more queries in the augmentation query store that include at least a portion of the proper subset of search terms (504). For example, the augmentation query subsystem 114 of FIG. 1 or the candidate list generator 304 of FIG. 3 can compare queries stored within the augmentation query store 116 to the subset of search terms identified by stage 502 to locate augmentation queries which include at least two of the subset of search terms.

Figure 6:
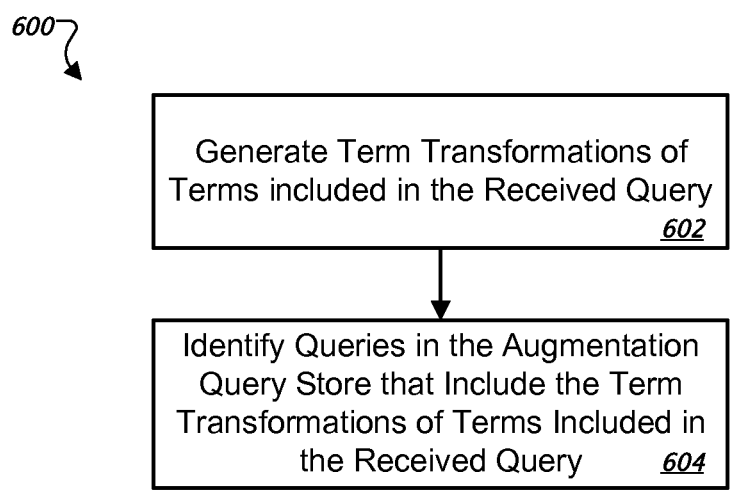
FIG. 6 is a flow diagram of another example process for identifying candidate augmentation queries.

FIG. 6 is a flow diagram of another example process 600 for identifying candidate augmentation queries. The process 600 can, for example, be implemented in the augmentation query subsystem 114 of FIG. 1, or in the candidate list generator 304 of FIG. 3.

The process 600 generates term transformations of terms included in the received query (602). For example, the augmentation query subsystem 114 of FIG. 1 or the candidate list generator 304 of FIG. 3 can identify a subset of the terms within the query 109 which are eligible for transformation. Examples of terms which may not be eligible for transformation include location names, commonly occurring terms (e.g., tourist destinations, pop culture icons, or brand names), and proper names of people. Examples of term transformations can include synonyms, stem reduction, compound synonyms, and correction of suspected misspellings. Any subset of the terms of the query 109 can be transformed.

The process 600 identifies queries in the augmentation query store that include the term transformations of terms included in the received query (604). For example, the augmentation query subsystem 114 of FIG. 1 or the candidate list generator 304 of FIG. 3 can identify queries stored within the augmentation query store 116 which match a subset of the transformed terms and optionally the original (e.g., non-transformed) terms from the query 109.

In some implementations, repeated substitutions of term transformations can be used. For example, the process 600 may begin with a single term transformation. If the process 600 identifies few or no matching augmentation queries based upon the subset of terms including the single transformation, additional and/or other term transformations can be attempted by returning to 602 in the process 600.

Figure 7:
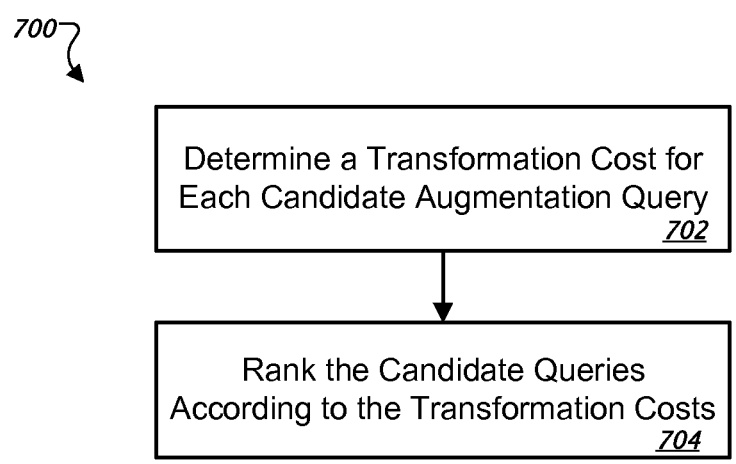
FIG. 7 is a flow diagram of an example process for selecting a candidate augmentation query.

FIG. 7 is a flow diagram of an example process 700 for selecting a candidate augmentation query. The process 700 can, for example, be implemented in the augmentation query subsystem 114 of FIG. 1, or the candidate selector 306 of FIG. 3.

The process 700 determines a transformation cost for each candidate augmentation query (702). For example, the augmentation query subsystem 114 of FIG. 1 or the candidate selector 306 of FIG. 3 can determine a transformation score based upon how similar the synonym transformation of one or more terms of the query 109 is to the original terms within the query 109. In some implementations, the synonym score can be based, in part, upon the number of synonym transformations applied to the query terms 109 and/or the relative importance of the transformed search term (e.g., noun, location, verb, or adjective). Other transformation costs, as described above, can also be used.

The process 700 ranks the candidate queries according to the transformation costs (704). For example, the augmentation query subsystem 114 of FIG. 1 or the candidate selector 306 of FIG. 3 can order the candidate queries according to how close the synonym transformations are to the original query 109. Thereafter, one or more top-ranking queries can be selected from the candidate list.

Figure 8:
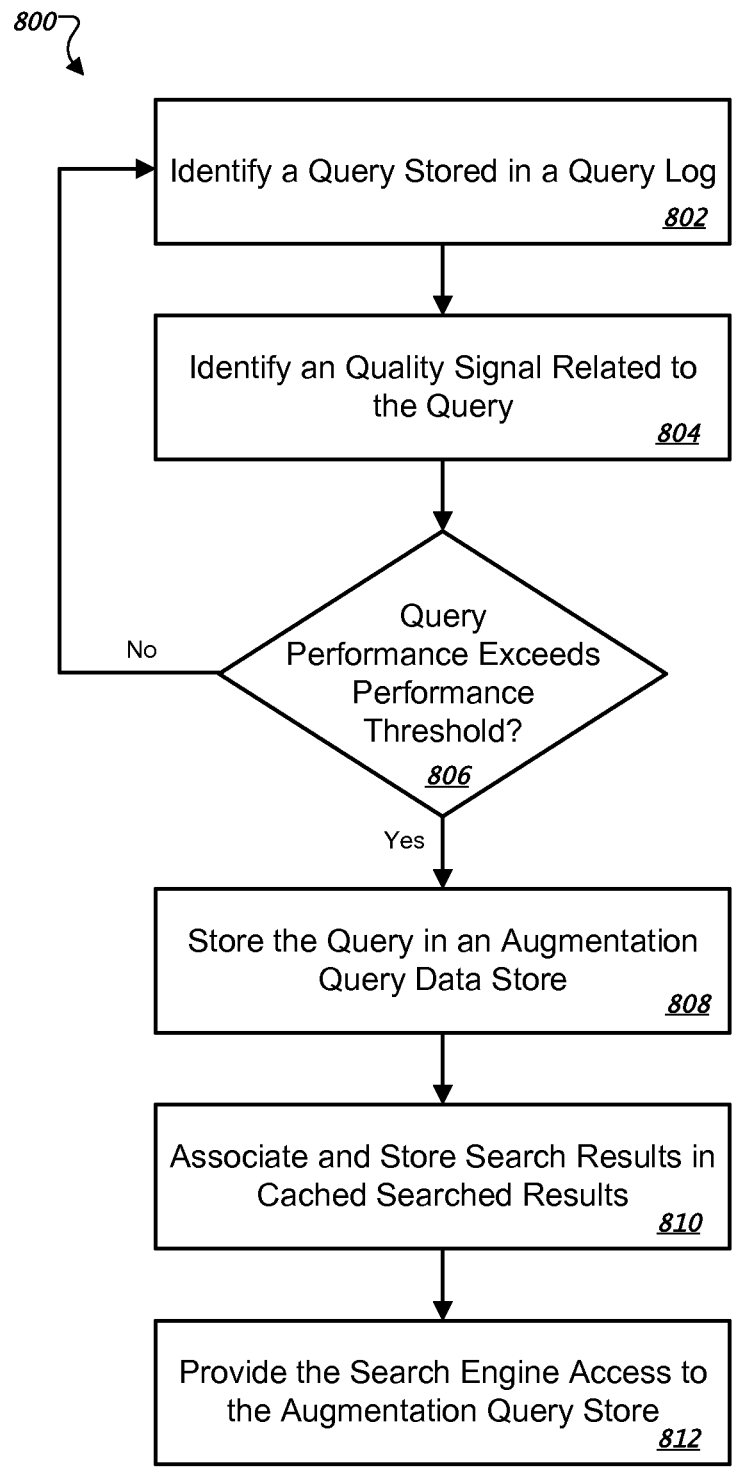
FIG. 8 is a flow diagram of an example process for identifying and storing augmentation queries.

FIG. 8 is a flow diagram of an example process 800 for identifying and storing augmentation queries. The example process 800 can be implemented in the query subsystem 114 of FIG. 1 and/or the query evaluator 200 of FIG. 2A.

The process 800 identifies a query stored in a query log (802). For example, the query subsystem 114 of FIG. 1 or the query evaluator 200 of FIG. 2A can identify a query stored within the query logs 120.

The process 800 identifies a quality signal related to the identified query (804). For example, the query subsystem 114 of FIG. 1 or the query evaluator 200 of FIG. 2A can map the selected query to information stored within the query logs 120 and/or the click logs 122 to derive one or more quality signals related to the identified query and a corresponding query performance. The quality signals can, for example, include explicit signals 202 (e.g., a survey or user engagement) and/or implicit signals 204 (e.g., long click data, frequency data, or IR scores), or other signals that are indicative of how well a query will perform in identifying information that is of interest to users.

The process 800 determines whether the identified query performance exceeds a performance threshold (806). For example, the query subsystem 114 of FIG. 1 or the query evaluator 200 of FIG. 2A can evaluate the identified quality signal to determine whether or not the identified query performance exceeds the performance threshold 124. The process 800 can use different performance thresholds, in some implementations, depending upon the type of query identified. For example, queries related to pop icons and/or current news stories can be based upon different frequency performance criteria and click-through criteria than queries related to macramé.

If the process 800 determines that the identified query does not exceed the performance threshold, then the process 800 identifies another stored query (802) and repeats. For example, the query subsystem 114 of FIG. 1 or the query evaluator 200 of FIG. 2A can select the next query within the query logs 120.

If the process 800 determines that the identified query does exceed the performance threshold, then the process 800 stores the query in an augmentation query data store (808). For example, the query subsystem 114 of FIG. 1 or the query evaluator 200 of FIG. 2A can store the identified query within the augmentation query store 116. In some implementations, performance data and/or performance score(s) can be stored in the augmentation query store 116 along with the identified query.

The process 800 associates and stores search results in a search results cache (810). For example, the query subsystem 114 of FIG. 1 or the query evaluator 200 of FIG. 2A identify search results related to the query by submitting the query to the search engine 112 and receiving search results, or by mining click logs 122 to identify particular search results that were selected by users. These search results can be associated with the query and stored in the cached search results stores. In some implementations, that cached search results store 206 does not actually store a cached document, but instead indexes the query to a document corpus that includes the documents that are identified as search results.

The process 800 provides the search engine access to the augmentation query store (812). For example, the query subsystem 114 of FIG. 1 or the query evaluator 200 of FIG. 2A can provide the search engine 112 with access to the augmentation query store 116. In some implementations, the search engine 112 can use the contents of the augmentation query store 116 for performing augmented search operations.

Figure 9:
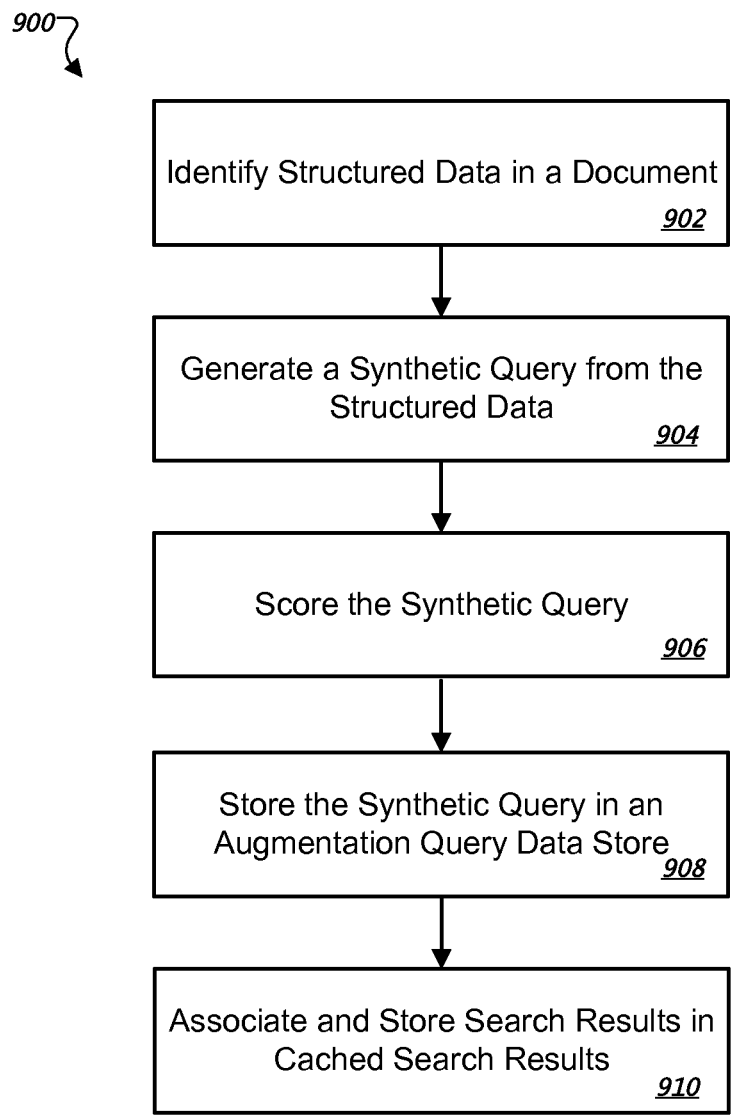
FIG. 9 is a flow diagram of an example process for generating and storing synthetic queries from structured data.

FIG. 9 is a flow diagram of an example process 900 for generating and storing synthetic queries from structured data. The example process 900 can be implemented in the query subsystem 114 of FIG. 1 and/or the augmentation query generator 300 of FIG. 3.

The process 900 identifies structured data in a document (902). For example, the query subsystem 114 of FIG. 1 or the augmentation query generator 250 of FIG. 2B can identify structured data within the structured document corpus 126, such as entity name listings, anchor text, and document titles.

The process 900 generates a synthetic query from the structured data (904). For example, the query subsystem 114 of FIG. 1 or the augmentation query generator 250 of FIG. 2B, using the structure rule set 252, can format a portion of structured data from the structured document corpus 126 into a synthetic query. In one example, data from entity name listings, anchor text and document titles can be used to create synthetic queries related to business entities.

The process 900 scores the synthetic query (906). For example, the query subsystem 114 of FIG. 1, or the augmentation query generator 250 of FIG. 2B can assign a score to the synthetic query that can be used to rank the synthetic queries when selected as candidate augmentation queries. In some implementations, the synthetic queries are scored based on the source of the structured data. For example, synthetic queries from structured data from a trusted source or a source that has a high level of configuration control, such as an established company, may be scored higher than synthetic queries from structured data from a source that is less trusted or a source that has less configuration control, such as a local community page. By way of another example, synthetic queries from structured data from a source that primarily provides data in searchable format, such as a directory site, a searchable government document repository, or business listing site, can be scored higher than synthetic queries from data that is less structured, such as blog page.

The process 900 stores the synthetic query in an augmentation query data store (908). For example, the query subsystem 114 of FIG. 1 or the augmentation query generator 250 of FIG. 2B can store the synthetic query in the augmentation query store 116.

The process 900 associates and stores search results in a search results cache (910). For example, the query subsystem 114 of FIG. 1 or the augmentation query generator 250 of FIG. 2B can identify search results related to the synthetic query by submitting the query to the search engine 112 and receiving search results.

In some implementations, search results are associated independent of the performance of the synthetic queries, e.g., independent of any relevance measure of the synthetic queries to the associated pages determined by the search engine 112. In these implementations, the augmentation query generator 250 associates the synthetic query with one or more documents based on a one or more signals that the documents are highly relevant to the subject matter identified by the synthetic query, such as a matching domain name of a URL; matching text set off by title tags; etc.

These search results can be stored in the cached search results stores. In some implementations, that cached search results store 206 does not actually store a cached document, but instead indexes the query to a document corpus that includes the documents that are identified as search results.

The augmentation query subsystem 114, the query evaluator 200, the augmentation query generator 250, and/or the query selector 300 can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium. The augmentation query subsystem 114, the query evaluator 200, the augmentation query generator 250, and/or the query selector 300 can be implemented in multiple computers over a network, such as a server farm, or can be implemented in a single computer device.

The augmentation queries also have other applications in addition being used as input to an augmentation search operation. For example, the augmentation queries can be used to identify key words or phrases for bidding in auctions, as the key words and phrases of these augmentation queries are from queries that perform well. Likewise, the augmentation queries can be used for selecting advertisements responsive to the received query. For example, an advertisement selection process that uses query keywords and phrases as input can also be used to select advertisements for keywords and phrases from selected augmentation queries.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine readable storage device, a machine readable storage substrate, a memory device, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

A computing system can be implemented in a system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
receiving a query from a user device;
identifying, by a data processing apparatus and based on the received query, a ranking of augmentation queries, the ranking of augmentation queries including one or more user-generated augmentation queries and one or more machine-generated synthetic augmentation queries, wherein:
   each user-generated augmentation query is a query previously received from a user; and
   each synthetic augmentation query is generated by the data processing apparatus and from a respective structured document of a corpus of structured documents, each structured document including multiple structured sections defined by a structure of the structured document that each include a particular type of data of the structured document, each synthetic augmentation query being generated based on one or more words extracted from one or more particular structured sections of the synthetic augmentation query's respective structured document, the one or more particular structured sections being structured sections from which queries that have at least a threshold performance have been generated, wherein the respective structured document from which at least one synthetic augmentation query was generated is different from the respective structured document from which a different synthetic augmentation query was generated;
adjusting, by the data processing apparatus, the ranking of the one or more synthetic augmentation queries relative to the one or more user-generated augmentation queries based on a type of information to which the received query is directed, the adjusting comprising:
   increasing a rank of each synthetic augmentation query relative to each user-generated augmentation query whenever the type of information is a first type; and
   reducing the rank of each synthetic augmentation query relative to each user-generated augmentation query whenever the type of information is a second type different from the first type;
selecting, by the data processing apparatus, a given augmentation query based on the adjusted ranking; and
providing, by the data processing apparatus and to the user device, a search result responsive to the given augmentation query.

2. The method of claim 1, wherein:
the second type of information comprises general information; and
adjusting the ranking of the one or more synthetic queries relative to the one or more user-generated queries comprises:
   determining that the received search query is directed to general information; and in response to determining that the received search query is directed to general information, reducing the ranking of the one or more synthetic augmentation queries relative to the one or more user-generated augmentation queries.

3. The method of claim 1, wherein:

the first type of information comprises specific information; and adjusting the ranking of the one or more synthetic queries relative to the one or more user-generated queries comprises:

determining that the received search query is directed to specific information; and in response to determining that the received search query is directed to specific information, increasing the ranking of the one or more synthetic augmentation queries relative to the one or more user-generated augmentation queries.

4. The method of claim 1, wherein providing the search result responsive to the given augmentation query comprises initiating a search using the given augmentation query to identify the search result.

5. The method of claim 1, further comprising providing, to the user device, a search result responsive to the received query for presentation with the search result responsive to the given augmentation query.

6. The method of claim 1, further comprising:

identifying a given search result that is identified by a search engine using both the received search query and the given augmentation query; and increasing, based on the given search result being identified using both the received search query and the given augmentation query, a presentation position of the given search result on a search results page provided to the user device in response to the received search query.

7. The method of claim 1, wherein the ranking of augmentation queries is based on at least one of (i) performance of the augmentation queries or (ii) measures of relatedness between the augmentation queries and the received query.

8. The method of claim 1, wherein the first type of information comprises specific information and the second type of information comprises general information.

9. The method of claim 1, wherein the multiple structured sections of each respective structured document comprise at least one of a title of the structured document, anchor text of the structured document or a section defined by particular HTML tags, the method further comprising generating the synthetic augmentation queries by mining a set of structured documents and extracting text from the one or more particular structured sections of the structured documents in the set of structured documents.

10. A system, comprising:

a data processing apparatus comprising one or more processors; and a memory storage apparatus in data communication with the data processing apparatus, the memory storage apparatus storing instructions executable by the data processing apparatus and that upon such execution cause the data processing apparatus to perform operations comprising:

receiving a query from a user device;

identifying, based on the received query, a ranking of augmentation queries, the ranking of augmentation queries including one or more user-generated augmentation queries and one or more machine-generated synthetic augmentation queries, wherein:

each user-generated augmentation query is a query previously received from a user; and each synthetic augmentation query is generated by the data processing apparatus and from a respective structured document of a corpus of structured documents, each structured document including multiple structured sections defined by a structure of the structured document that each include a particular type of data of the structured document, each synthetic augmentation query being generated based on one or more words extracted from one or more particular structured sections of the synthetic augmentation query's respective structured document, the one or more particular structured sections being structured sections from which queries that have at least a threshold performance have been generated, wherein the respective structured document from which at least one synthetic augmentation query was generated is different from the respective structured document from which a different synthetic augmentation query was generated;

adjusting the ranking of the one or more synthetic augmentation queries relative to the one or more user-generated augmentation queries based on a type of information to which the received query is directed, the adjusting comprising:

increasing a rank of each synthetic augmentation query relative to each user-generated augmentation query whenever the type of information is a first type; and reducing the rank of each synthetic augmentation query relative to each user-generated augmentation query whenever the type of information is a second type different from the first type;

selecting a given augmentation query based on the adjusted ranking; and providing, to the user device, a search result responsive to the given augmentation query.

11. The system of claim 10, wherein:

the second type of information comprises general information; and adjusting the ranking of the one or more synthetic queries relative to the one or more user-generated queries comprises:

determining that the received search query is directed to general information; and in response to determining that the received search query is directed to general information, reducing the ranking of the one or more synthetic augmentation queries relative to the one or more user-generated augmentation queries.

12. The system of claim 10, wherein:

the first type of information comprises specific information; and adjusting the ranking of the one or more synthetic queries relative to the one or more user-generated queries comprises:

determining that the received search query is directed to specific information; and in response to determining that the received search query is directed to specific information, increasing the ranking of the one or more synthetic augmentation queries relative to the one or more user-generated augmentation queries.

13. The system of claim 10, wherein providing the search result responsive to the given augmentation query comprises initiating a search using the given augmentation query to identify the search result.

14. The system of claim 10, wherein the operations further comprise providing, to the user device, a search result responsive to the received query for presentation with the search result responsive to the given augmentation query.

15. The system of claim 10, wherein the operations further comprise:
    identifying a given search result that is identified by a search engine using both the received search query and the given augmentation query; and
    increasing, based on the given search result being identified using both the received search query and the given augmentation query, a presentation position of the given search result on a search results page provided to the user device in response to the received search query.

16. The method of claim 10, wherein the ranking of augmentation queries is based on at least one of (i) performance of the augmentation queries or (ii) measures of relatedness between the augmentation queries and the received query.

17. A non-transitory computer storage medium encoded with a computer program, the program comprising instructions that when executed by a data processing apparatus cause the data processing apparatus to perform operations comprising:
    receiving a query from a user device;
    identifying, based on the received query, a ranking of augmentation queries, the ranking of augmentation queries including one or more user-generated augmentation queries and one or more machine-generated synthetic augmentation queries, wherein:
        each user-generated augmentation query is a query previously received from a user; and
        each synthetic augmentation query is generated by the data processing apparatus and from a respective structured document of a corpus of structured documents, each structured document including multiple structured sections defined by a structure of the structured document that each include a particular type of data of the structured document, each synthetic augmentation query being generated based on one or more words extracted from one or more particular structured sections of the synthetic augmentation query's respective structured document, the one or more particular structured sections being structured sections from which queries that have at least a threshold performance have been generated, wherein the respective structured document from which at least one synthetic augmentation query was generated is different from the respective structured document from which a different synthetic augmentation query was generated;
    adjusting the ranking of the one or more synthetic augmentation queries relative to the one or more user-generated augmentation queries based on a type of information to which the received query is directed, the adjusting comprising:
        increasing a rank of each synthetic augmentation query relative to each user-generated augmentation query whenever the type of information is a first type; and
        reducing the rank of each synthetic augmentation query relative to each user-generated augmentation query whenever the type of information is a second type different from the first type;
    selecting a given augmentation query based on the adjusted ranking; and
    providing, to the user device, a search result responsive to the given augmentation query.

18. The non-transitory computer storage medium of claim 17, wherein:
    the second type of information comprises general information; and
    adjusting the ranking of the one or more synthetic queries relative to the one or more user-generated queries comprises:
        determining that the received search query is directed to general information; and
        in response to determining that the received search query is directed to general information, reducing the ranking of the one or more synthetic augmentation queries relative to the one or more user-generated augmentation queries.

19. The non-transitory computer storage medium of claim 17, wherein:
    the first type of information comprises specific information; and
    adjusting the ranking of the one or more synthetic queries relative to the one or more user-generated queries comprises:
        determining that the received search query is directed to specific information; and
        in response to determining that the received search query is directed to specific information, increasing the ranking of the one or more synthetic augmentation queries relative to the one or more user-generated augmentation queries.

20. The non-transitory computer storage medium of claim 17, wherein providing the search result responsive to the given augmentation query comprises initiating a search using the given augmentation query to identify the search result.

* * * * *